United States Patent
Kaneichi (10) Patent No.: US 11,651,299 B2
(45) Date of Patent: May 16, 2023

(54) CONTROL DEVICE, CONTROL SYSTEM, PROGRAM, AND CONTROL METHOD

(71) Applicant: Toyota Jidosha Kabushiki Kaisha, Toyota (JP)

(72) Inventor: Daiki Kaneichi, Tokyo (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/104,176

(22) Filed: Nov. 25, 2020

(65) Prior Publication Data
US 2021/0256430 A1  Aug. 19, 2021

(30) Foreign Application Priority Data
Feb. 17, 2020  (JP) .............. JP2020-024606

(51) Int. Cl.
*G06Q 10/02* (2012.01)
*H04W 4/23* (2018.01)
*G06Q 10/0631* (2023.01)
*G06Q 30/0241* (2023.01)
*G06Q 30/0207* (2023.01)
*G07B 15/02* (2011.01)
*H04W 4/021* (2018.01)
(Continued)

(52) U.S. Cl.
CPC ....... *G06Q 10/02* (2013.01); *G06Q 10/06311* (2013.01); *G06Q 30/0222* (2013.01); *G06Q 30/0239* (2013.01); *G06Q 30/0277* (2013.01); *G07B 15/02* (2013.01); *H04W 4/021* (2013.01); *H04W 4/23* (2018.02); *H04W 4/40* (2018.02); *G06Q 2240/00* (2013.01); *H04W 4/21* (2018.02)

(58) Field of Classification Search
CPC ............ G06Q 10/02; G06Q 10/06311; G06Q 30/0222; G06Q 30/0239; G06Q 30/0277; G06Q 2240/00; H04W 4/23; H04W 4/40; H04W 4/021; H04W 4/21; G07B 15/02
USPC ............................................. 705/5
See application file for complete search history.

(56) References Cited

U.S. PATENT DOCUMENTS

| | | | |
|---|---|---|---|
| 2016/0063616 A1* | 3/2016 | Bassett | G06Q 30/0645 705/13 |
| 2017/0127215 A1* | 5/2017 | Khan | H04W 12/64 |
| 2018/0357668 A1* | 12/2018 | Kanemoto | G06Q 30/0259 |

(Continued)

FOREIGN PATENT DOCUMENTS

| | | |
|---|---|---|
| CN | 102164127 A | 8/2011 |
| JP | 2002-342426 A | 11/2002 |

(Continued)

OTHER PUBLICATIONS

"A Queueing-Theoretic Framework for Vehicle Dispatching in Dynamic Car-Hailing" Published by IEEE (Year: 2019).*

(Continued)

*Primary Examiner* — Zeina Elchanti
(74) *Attorney, Agent, or Firm* — Dinsmore & Shohl LLP (57) ABSTRACT

A control device includes a communication unit that communicates with a user terminal provided with a chat function, and a control unit that transmits to the user terminal, via the communication unit, a message notifying a user of a state of a vehicle heading to a vehicle dispatch point designated by the user who has made a reservation for vehicle dispatch. The message is to be output from the user terminal by the chat function.

18 Claims, 8 Drawing Sheets

(51) Int. Cl.
*H04W 4/40* (2018.01)
*H04W 4/21* (2018.01)

(56) References Cited

U.S. PATENT DOCUMENTS

2021/0150420 A1* 5/2021 Hurley ................... G06Q 50/30
2021/0150556 A1* 5/2021 Kimura .................. G06Q 50/30

FOREIGN PATENT DOCUMENTS

| JP | 2016-122432 A | 7/2016 |
| JP | 2019-040509 A | 3/2019 |
| JP | 2019-046323 A | 3/2019 |

OTHER PUBLICATIONS

White Cat Series "How does DIDI taxi open the notification of new message?" Dec. 8, 2019. (https://jingyan.baidu.com/article/39810a23379f51f63 7fda66d.html) (see partial translation of office action issued to CN202011284441.0).

* cited by examiner

CONTROL DEVICE, CONTROL SYSTEM, PROGRAM, AND CONTROL METHOD

CROSS-REFERENCE TO RELATED APPLICATION

This application claims priority to Japanese Patent Application No. 2020-024606 filed on Feb. 17, 2020, incorporated herein by reference in its entirety.

BACKGROUND

1. Technical Field

The present disclosure relates to a control device, a control system, a program and a control method.

2. Description of Related Art

Japanese Unexamined Patent Application Publication No. 2002-342426 describes a technology for allocating taxis via a communication unit.

SUMMARY

However, the above technology does not enable a vehicle dispatch service to provide sufficient convenience.

The present disclosure is intended to enhance the convenience of a vehicle dispatch service.

A control device according to the present disclosure includes a communication unit configured to communicate with a user terminal provided with a chat function, and a control unit configured to transmit to the user terminal, via the communication unit, a message notifying a user of a state of a vehicle heading to a vehicle dispatch point designated by a user who has made a reservation for vehicle dispatch. The message is to be output from the user terminal by the chat function.

A program according to the present disclosure is a program that causes a computer used by a user to provide a chat function, receive a message notifying a user of a state of a vehicle heading to a vehicle dispatch point designated by the user who has made a reservation for vehicle dispatch, and output the received message using the chat function.

A control method according to the present disclosure is a control method executed by a control device. The control method includes a step of transmitting, to a user terminal provided with a chat function, a message notifying a user of a state of a vehicle heading to a vehicle dispatch point designated by a user who has made a reservation for vehicle dispatch. The message is to be output from the user terminal by the chat function.

With each aspect of the present disclosure, the convenience of the vehicle dispatch service can be enhanced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment will be described with reference to the drawings.

In each of the drawings, the same or equivalent components are denoted by the same reference numerals. For the description of the present embodiment, the descriptions of the same or equivalent components will be appropriately omitted or simplified.

Figure 1:
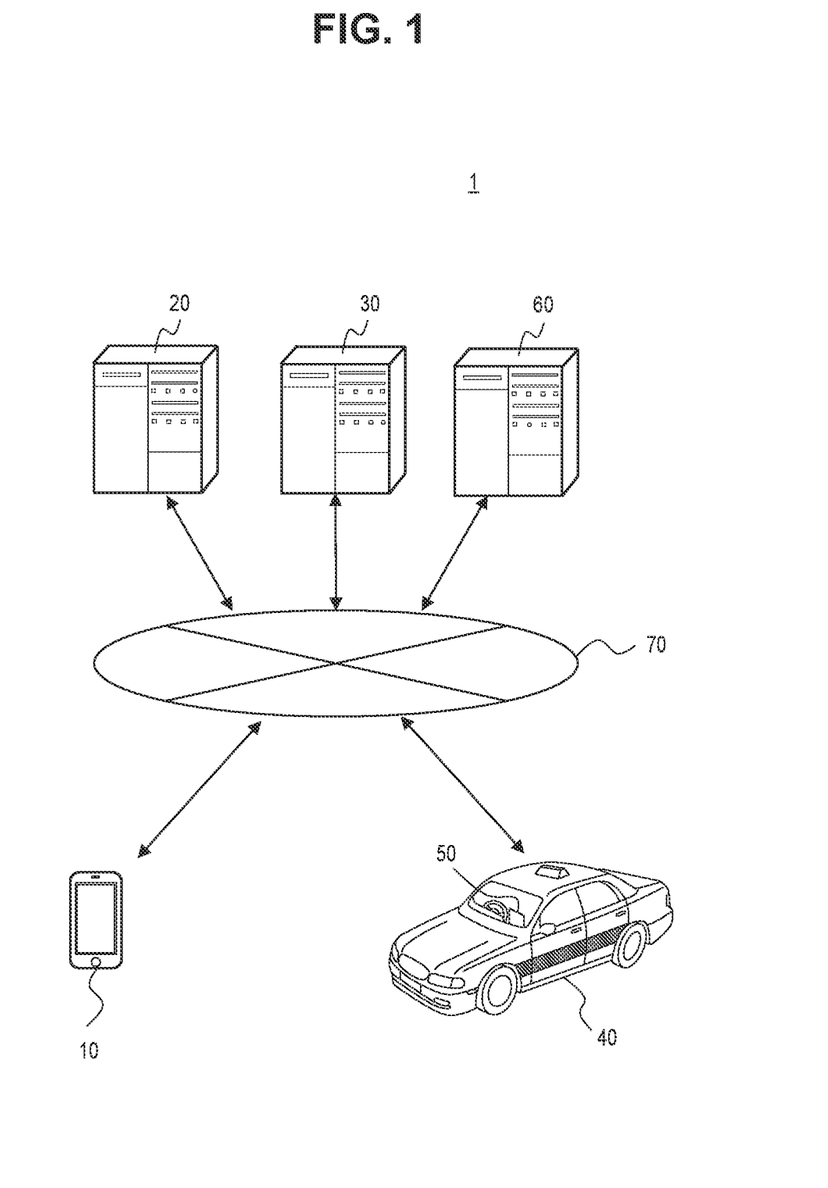
FIG. 1 is a diagram illustrating a configuration of a control system according to an embodiment.

A configuration of a control system 1 according to the present embodiment will be described with reference to FIG. 1.

The control system 1 includes at least one user terminal 10, at least one SNS server 20, at least one vehicle dispatch server 30, at least one vehicle 40, at least one vehicle terminal 50, and at least one payment server 60. "SNS" is an abbreviation for social networking service.

The user terminal 10 can communicate with the SNS server 20, the vehicle dispatch server 30, and the payment server 60 via a network 70, such as a mobile communication network or the internet. The user terminal 10 may be capable of communicating with at least one of the vehicle 40 and the vehicle terminal 50 via the network 70.

The SNS server 20 can communicate with the user terminal 10, the vehicle terminal 50, and the payment server 60 via the network 70. The SNS server 20 may be capable of communicating with at least one of the vehicle dispatch server 30 and the vehicle 40 via the network 70.

The vehicle dispatch server 30 can communicate with the user terminal 10 and the vehicle terminal 50 via the network 70. The vehicle dispatch server 30 may be capable of communicating with at least one of the SNS server 20, the vehicle 40 and the payment server 60 via the network 70.

The vehicle 40 is a taxi in the present embodiment, but may be an automobile other than a taxi, such as an on-demand bus, as long as it can pick up and drop off at least one user. The vehicle 40 may be, for example, a gasoline vehicle, a diesel vehicle, an HV, a PHV, an EV, an FCV, or any other type of vehicle. "HV" is an abbreviation for a hybrid vehicle. "PHV" is an abbreviation for a plug-in hybrid vehicle. "EV" is an abbreviation for an electric vehicle. "FCV" is an abbreviation for a fuel cell vehicle. The vehicle 40 is driven by a driver in the present embodiment, but may be automatically driven to any level of driving automation. The driving automation level may be, for example, any of level 1 to level 5 according to the SAE level classification. "SAE" is an abbreviation for "Society of Automotive Engineers". The vehicle 40 may be a MaaS vehicle. "MaaS" is an abbreviation for "Mobility as a Service".

The vehicle terminal 50 can communicate with the SNS server 20 and the vehicle dispatch server 30 via the network 70. The vehicle terminal 50 may be capable of communicating with at least one of the user terminal 10, the vehicle 40 and the payment server 60 via the network 70.

The payment server 60 can communicate with the user terminal 10 and the SNS server 20 via the network 70. The payment server 60 may be capable of communicating with at least one of the vehicle dispatch server 30, the vehicle 40 and the vehicle terminal 50 via the network 70.

An outline of the present embodiment will be described with reference to FIG. 1.

The control device corresponding to the SNS server 20 transmits a message, to the user terminal 10 provided with a chat function, notifying a user of a status of the vehicle 40, the status of the vehicle is acquired from the vehicle terminal 50 used in the vehicle 40 through which reservation for vehicle dispatch is received. The user terminal 10 outputs, in the form of a display or voice, the message received from the control device corresponding to the SNS server 20 to the user using the chat function.

In the present embodiment, the user can use the chat function provided in the user terminal 10 to identify the state of the vehicle 40 for which the user has made a reservation for vehicle dispatch. Consequently, the convenience of the vehicle dispatch service can be improved.

Figure 2:
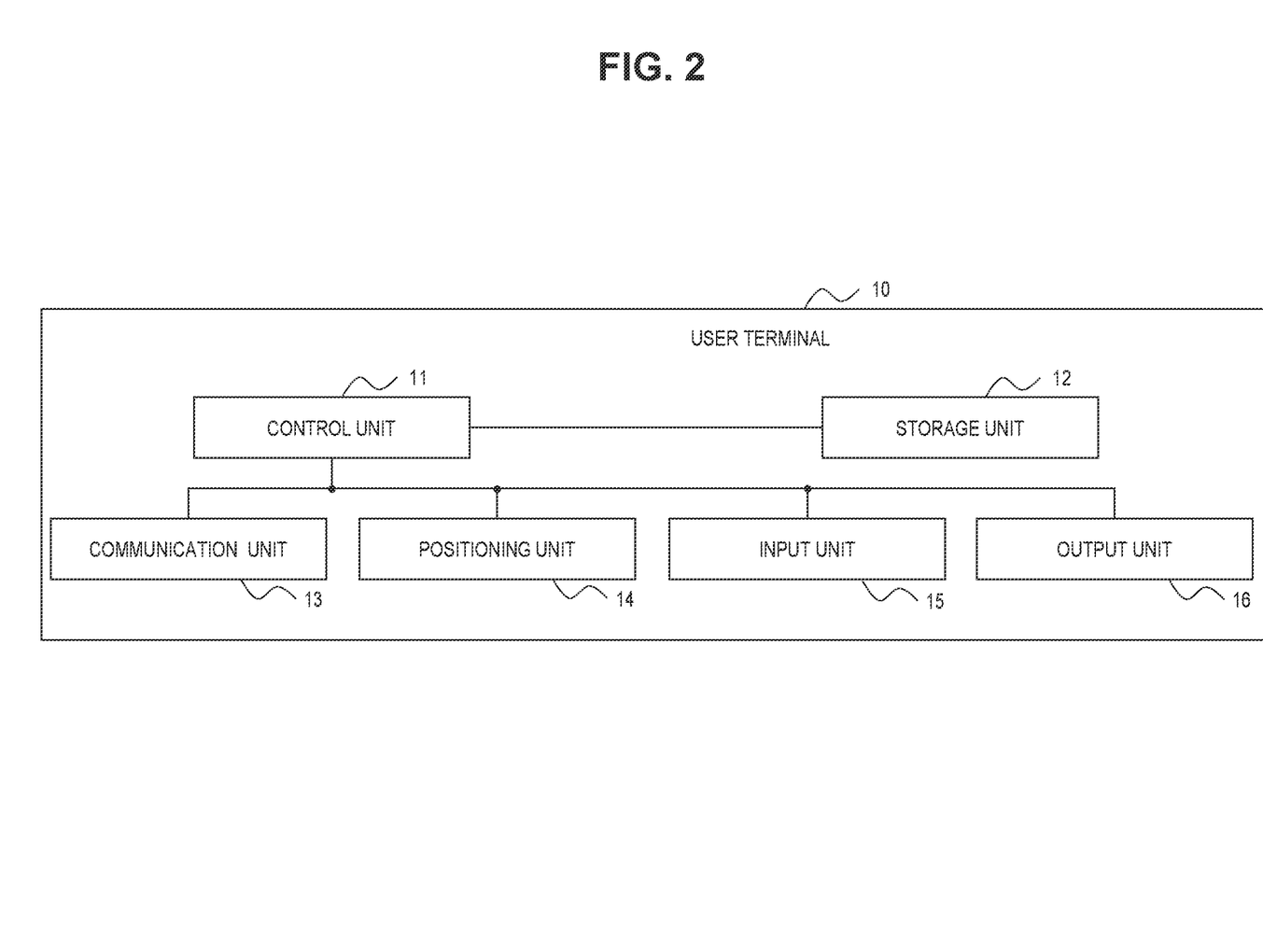
FIG. 2 is a diagram illustrating a configuration of a user terminal according to the embodiment.

A configuration of the user terminal 10 according to the present embodiment will be described with reference to FIG. 2. The user terminal 10 may be, for example, a mobile phone, a smartphone, a tablet, or a PC. "PC" is an abbreviation for a personal computer.

The user terminal 10 includes a control unit 11, a storage unit 12, a communication unit 13, a positioning unit 14, an input unit 15, and an output unit 16.

The control unit 11 includes one or more processors, or one or more dedicated circuits, or a combination thereof. The processor is a general-purpose processor (such as a CPU) or a dedicated processor specialized for specific processing. "CPU" is an abbreviation for a central processing unit. The dedicated circuit may be, for example, an FPGA or an ASIC. "FPGA" is an abbreviation for a field-programmable gate array. "ASIC" is an abbreviation for an application specific integrated circuit. The control unit 11 executes information processing related to the operation of the user terminal 10 while controlling each unit of the user terminal 10.

The storage unit 12 includes one or more semiconductor memories, one or more magnetic memories, one or more optical memories, or a combination of at least two of these memory types. The semiconductor memory may be, for example, a RAM or a ROM. "RAM" is an abbreviation for a random access memory. "ROM" is an abbreviation for a read-only memory. The RAM may be, for example, an SRAM or a DRAM. "SRAM" is an abbreviation for a static random access memory. "DRAM" is an abbreviation for a dynamic random access memory. The ROM may be, for example, an EEPROM. "EEPROM" is an abbreviation for an electrically erasable programmable read-only memory. The storage unit 12 may function as, for example, a main storage device, an auxiliary storage device, or a cache memory. The storage unit 12 stores information used for the operation of the user terminal 10 and information acquired by the operation of the user terminal 10.

The communication unit 13 includes one or more communication interfaces. The communication interface may be, for example, an interface corresponding to a mobile communication standard such as LTE, 4G or 5G, or a LAN interface. "LTE" is an abbreviation for Long Term Evolution. "4G" is an abbreviation for Fourth Generation. "5G" is an abbreviation for Fifth Generation. "LAN" is an abbreviation for local area network. The communication unit 13 receives the information used for the operation of the user terminal 10 and transmits the information acquired by the operation of the user terminal 10.

The positioning unit 14 includes one or more GNSS receivers. "GNSS" is an abbreviation for a global navigation satellite system. The GNSS includes, for example, at least one of GPS, QZSS, GLONASS, and Galileo. "GPS" is an abbreviation for a Global Positioning System. "QZSS" is an abbreviation for a Quasi-Zenith Satellite System. QZSS satellites are referred to as quasi-zenith satellites. "GLONASS" is an abbreviation for a Global Navigation Satellite System. The positioning unit 14 acquires location information of the user terminal 10 as location information of the user.

The input unit 15 includes one or more input interfaces. The input interface may be, for example, a physical key, a capacitance key, a pointing device, a touch screen integrated with a display, or a microphone. The input unit 15 receives the input information used for the operation of the user terminal 10. The input unit 15 may be connected to the user terminal 10 as an external input device instead of being provided in the user terminal 10. Any method, such as USB, HDMI® or Bluetooth®, may be used as the connection method. "USB" is an abbreviation for a universal serial bus. "HDMI®" is an abbreviation for a High-Definition Multimedia Interface.

The output unit 16 includes one or more output interfaces. The output interface may be, for example, a display or a speaker. The display may be, for example, an LCD or an organic EL display. "LCD" is an abbreviation for a liquid crystal display. "EL" is an abbreviation for electroluminescence. The output unit 16 outputs the information acquired by the operation of the user terminal 10. The output unit 16 may be connected to the user terminal 10 as an external output device instead of being provided in the user terminal 10. Any method, such as USB, HDMI® or Bluetooth®, may be used as the connection method.

The function of the user terminal 10 is implemented by executing a user terminal program according to the present embodiment with the processor included in the control unit 11. In other words, the function of the user terminal 10 is implemented by software. The user terminal program is a program for causing the computer to execute processing a step included in the operation of the user terminal 10 such that the computer implements the function corresponding to the processing of the step. That is, the user terminal program is a program for causing the computer to function as the user terminal 10.

The program can be recorded in a computer-readable non-transitory storage medium. The computer-readable non-transitory storage medium may be, for example, a magnetic recording device, an optical disc, a magneto-optical recording medium, or a semiconductor memory. The program may be distributed by, for example, selling, transferring, or lending a portable storage medium, such as a DVD or a CD-ROM, in which the program is recorded. "DVD" is an abbreviation for a digital versatile disc. "CD-ROM" is an abbreviation for a compact disc read-only memory. The program may be stored in a storage of the server and transferred from the server to another computer so as to distribute the program. The program may be provided as a program product.

The computer temporarily stores the program recorded in the portable storage medium or the program transferred from the server, for example, in the main storage device. Then, the computer causes the processor to read the program stored in the main storage device, and causes the processor to execute processing according to the read program. The computer may read the program directly from the portable storage medium and execute processing according to the program. The computer may sequentially execute the processing according to the received program each time the program is transferred from the server to the computer. Instead of transferring the program from the server to the computer, the processing may be executed by a so-called ASP service that implements the function only by instructing the execution and obtaining the result. "ASP" is an abbreviation for an application service provider. The program includes information used for processing by an electronic computer, which is equivalent to the program. For example, data that is not a direct command to a computer but has the property of defining the processing of the computer corresponds to "equivalent to the program".

Some or all of the functions of the user terminal 10 may be implemented by the dedicated circuit included in the control unit 11. In other words, some or all of the functions of the user terminal 10 may be implemented by hardware.

Figure 3:
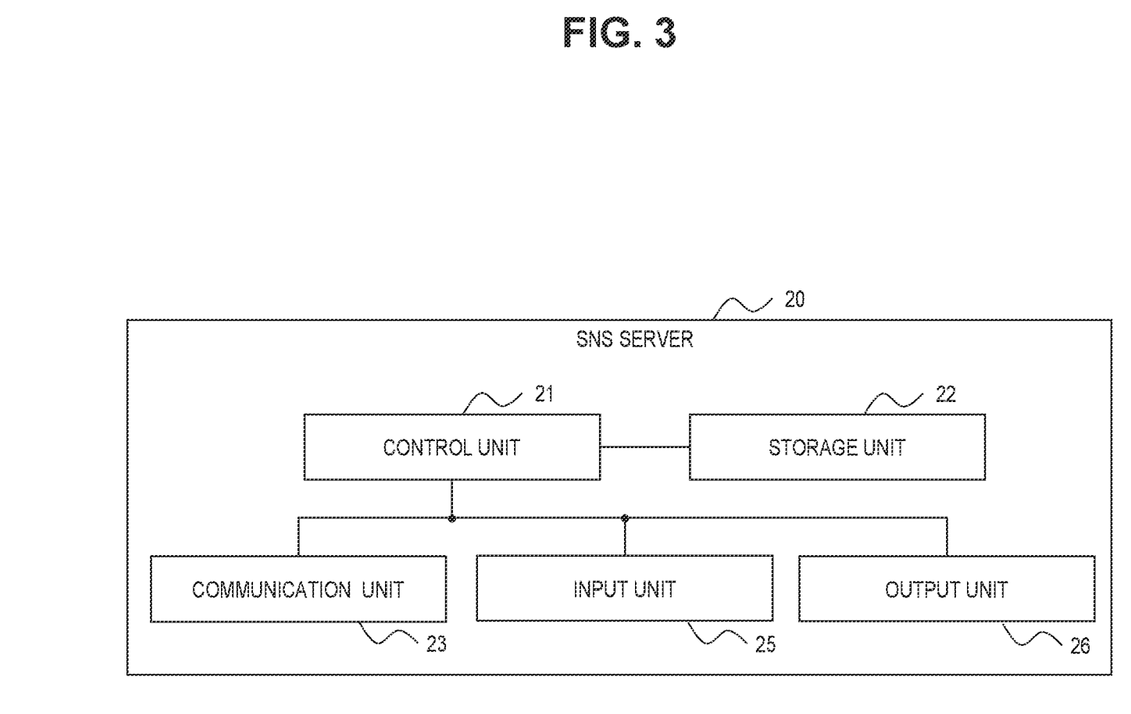
FIG. 3 is a diagram illustrating a configuration of a social network service (SNS) server according to the embodiment.

A configuration of the SNS server 20 according to the present embodiment will be described with reference to FIG. 3.

The SNS server 20 corresponds to the control device in the present embodiment. The SNS server 20 may be, for example, a server included in a cloud computing system or another computing system.

The SNS server 20 includes a control unit 21, a storage unit 22, a communication unit 23, an input unit 25, and an output unit 26.

The control unit 21 includes one or more processors, one or more dedicated circuits, or a combination thereof. The processor is a general-purpose processor (such as a CPU) or a dedicated processor specialized for specific processing. The dedicated circuit may be, for example, an FPGA or an ASIC. The control unit 21 executes information processing related to the operation of the SNS server 20 while controlling each unit of the SNS server 20.

The storage unit 22 includes one or more semiconductor memories, one or more magnetic memories, one or more optical memories, or a combination of at least two of these memory types. The semiconductor memory may be, for example, a RAM or a ROM. The RAM may be, for example, an SRAM or a DRAM. The ROM is, for example, an EEPROM. The storage unit 22 may function as, for example, a main storage device, an auxiliary storage device, or a cache memory. The storage unit 22 stores information used for the operation of the SNS server 20 and information acquired by the operation of the SNS server 20.

The communication unit 23 includes one or more communication interfaces. The communication interface may be, for example, a LAN interface. The communication unit 23 receives the information used for the operation of the SNS server, 20 and transmits the information acquired by the operation of the SNS server 20.

The input unit 25 includes one or more input interfaces. The input interface may be, for example, a physical key, a capacitance key, a pointing device, a touch screen integrated with a display, or a microphone. The input unit 25 accepts the input information used for the operation of the SNS server 20. The input unit 25 may be connected to the SNS server 20 as an external input device instead of being provided in the SNS server 20. Any method, such as USB, HDMI® or Bluetooth®, may be used as the connection method.

The output unit 26 includes one or more output interfaces. The output interface may be, for example, a display or a speaker. The display may be, for example, an LCD or an organic EL display. The output unit 26 outputs the information acquired by the operation of the SNS server 20. The output unit 26 may be connected to the SNS server 20 as an external output device instead of being provided in the SNS server 20. Any method, such as USB, HDMI® or Bluetooth®, may be used as the connection method.

The function of the SNS server 20 is implemented by executing a control program according to the present embodiment with the processor included in the control unit 21. In other words, the function of the SNS server 20 is implemented by software. The control program is a program for causing the computer to execute processing a step included in the operation of the SNS server 20 such that the computer implements the function corresponding to the processing of the step. That is, the control program is a program for causing the computer to function as the SNS server 20.

Some or all of the functions of the SNS server 20 may be implemented by the dedicated circuit included in the control unit 21. In other words, some or all of the functions of the SNS server 20 may be implemented by hardware.

Figure 4:
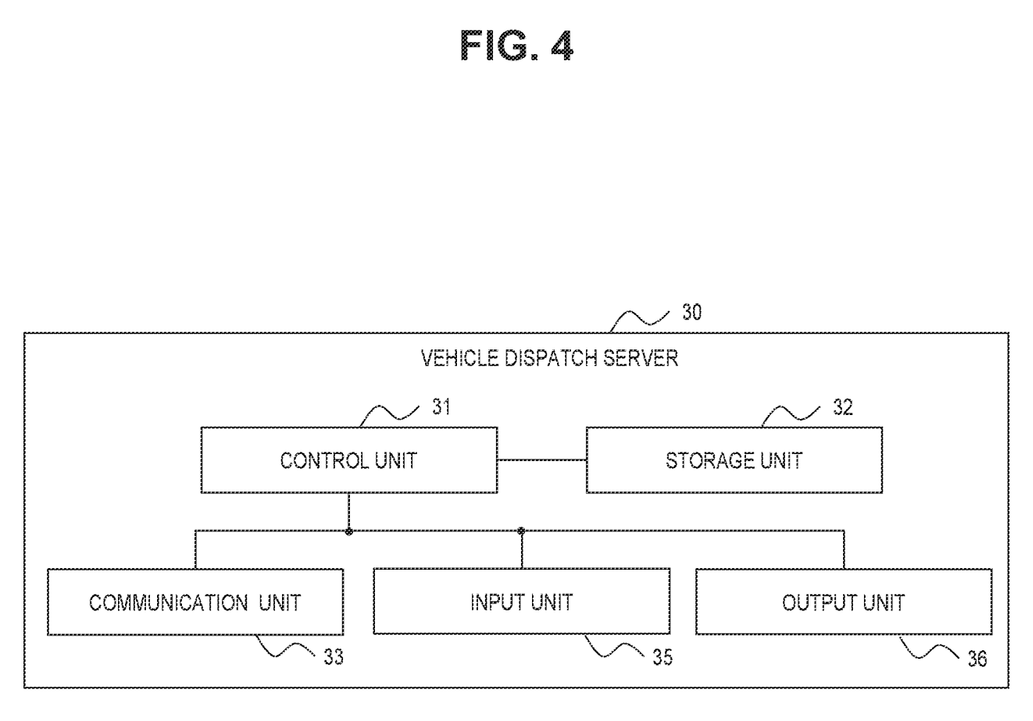
FIG. 4 is a diagram illustrating a configuration of a vehicle dispatch server according to the embodiment.

A configuration of the vehicle dispatch server 30 according to the present embodiment will be described with reference to FIG. 4.

The vehicle dispatch server 30 may be, for example, a server included in a cloud computing system or another computing system.

The vehicle dispatch server 30 includes a control unit 31, a storage unit 32, a communication unit 33, an input unit 35, and an output unit 36.

The control unit 31 includes one or more processors, or one or more dedicated circuits, or a combination thereof. The processor is a general-purpose processor (such as a CPU) or a dedicated processor specialized for specific processing. The dedicated circuit may be, for example, an FPGA or an ASIC. The control unit 31 executes information processing related to the operation of the vehicle dispatch server 30 while controlling each unit of the vehicle dispatch server 30.

The storage unit 32 includes one or more semiconductor memories, one or more magnetic memories, one or more optical memories, or a combination of at least two of these memory types. The semiconductor memory may be, for example, a RAM or a ROM. The RAM is, for example, an SRAM or a DRAM. The ROM is, for example, an EEPROM. The storage unit 32 functions as, for example, a main storage device, an auxiliary storage device, or a cache memory. The storage unit 32 stores information used for the operation of the vehicle dispatch server 30 and information acquired by the operation of the vehicle dispatch server 30.

The communication unit 33 includes one or more communication interfaces. The communication interface may be, for example, a LAN interface. The communication unit 33 receives the information used for the operation of the vehicle dispatch server 30, and transmits the information acquired by the operation of the vehicle dispatch server 30.

The input unit 35 includes one or more input interfaces. The input interface may be, for example, a physical key, a capacitance key, a pointing device, a touch screen integrated with a display, or a microphone. The input unit 35 accepts the input information used for the operation of the vehicle dispatch server 30. The input unit 35 may be connected to the vehicle dispatch server 30 as an external input device instead of being provided in the vehicle dispatch server 30. Any method, such as USB, HDMI® or Bluetooth®, may be used as the connection method.

The output unit 36 includes one or more output interfaces. The output interface may be, for example, a display or a speaker. The display may be, for example, an LCD or an organic EL display. The output unit 36 outputs the information acquired by the operation of the vehicle dispatch server 30. The output unit 36 may be connected to the vehicle dispatch server 30 as an external output device instead of being provided in the vehicle dispatch server 30. Any method, such as USB, HDMI® or Bluetooth®, may be used as the connection method.

The function of the vehicle dispatch server 30 is implemented by executing a vehicle dispatch program according to the present embodiment with the processor included in the control unit 31. In other words, the function of the vehicle dispatch server 30 is implemented by software. The vehicle dispatch program is a program for causing the computer to execute processing a step included in the operation of the vehicle dispatch server 30 such that the computer implements the function corresponding to the processing of the step. That is, the vehicle dispatch program is a program for causing the computer to function as the vehicle dispatch server 30.

Some or all of the functions of the vehicle dispatch server 30 may be implemented by the dedicated circuit included in the control unit 31. In other words, some or all of the functions of the vehicle dispatch server 30 may be implemented by hardware.

Figure 5:
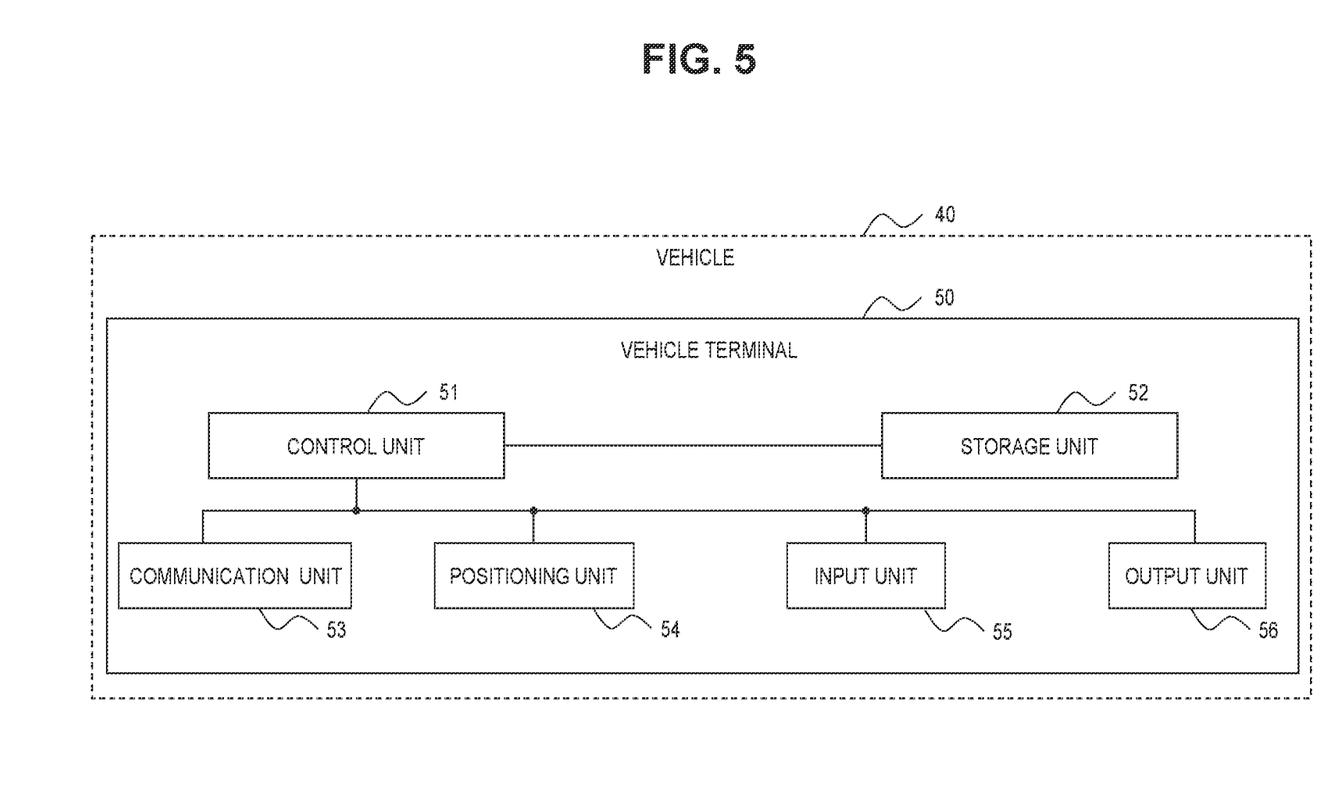
FIG. 5 is a diagram illustrating a configuration of a vehicle terminal according to the embodiment.

A configuration of the vehicle terminal 50 used in the vehicle 40 according to the present embodiment will be described with reference to FIG. 5.

The vehicle terminal 50 may be, for example, a car navigation device, a mobile phone, a smartphone, a tablet, or a PC.

The vehicle terminal 50 includes a control unit 51, a storage unit 52, a communication unit 53, a positioning unit 54, an input unit 55, and an output unit 56.

The control unit 51 includes one or more processors, or one or more dedicated circuits, or a combination thereof. The processor is a general-purpose processor (such as a CPU) or a dedicated processor specialized for specific processing. The dedicated circuit may be, for example, an FPGA or an ASIC. The control unit 51 executes information processing related to the operation of the vehicle terminal 50 while controlling each unit of the vehicle terminal 50.

The storage unit 52 includes one or more semiconductor memories, one or more magnetic memories, one or more optical memories, or a combination of at least two of these memory types. The semiconductor memory may be, for example, a RAM or a ROM. The RAM may be, for example, an SRAM or a DRAM. The ROM may be, for example, an EEPROM. The storage unit 52 functions as, for example, a main storage device, an auxiliary storage device, or a cache memory. The storage unit 52 stores information used for the operation of the vehicle terminal 50 and information acquired by the operation of the vehicle terminal 50.

The communication unit 53 includes one or more communication interfaces. The communication interface may be, for example, an interface corresponding to a mobile communication standard such as LTE, 4G or 5G. The communication unit 53 receives the information used for the operation of the vehicle terminal 50, and transmits the information acquired by the operation of the vehicle terminal 50.

The positioning unit 54 includes one or more GNSS receivers. The GNSS includes, for example, at least one of GPS, QZSS, GLONASS, and Galileo. The positioning unit 54 acquires location information of the vehicle 40.

The input unit 55 includes one or more input interfaces. The input interface may be, for example, a physical key, a capacitance key, a pointing device, a touch screen integrated with a display, or a microphone. The input unit 55 accepts the input information used for the operation of the vehicle terminal 50. The input unit 55 may be connected to the vehicle terminal 50 as an external input device instead of being provided in the vehicle terminal 50. Any method, such as USB, HDMI® or Bluetooth®, may be used as the connection method.

The output unit 56 includes one or more output interfaces. The output interface may be, for example, a display or a speaker. The display may be, for example, an LCD or an organic EL display. The output unit 56 outputs the information acquired by the operation of the vehicle terminal 50. The output unit 56 may be connected to the vehicle terminal 50 as an external output device (e.g., display audio) instead of being provided in the vehicle terminal 50. Any method, such as USB, HDMI® or Bluetooth®, may be used as the connection method.

The function of the vehicle terminal 50 is implemented by executing a vehicle terminal program according to the present embodiment with the processor included in the control unit 51. In other words, the function of the vehicle terminal 50 is implemented by software. The vehicle terminal program is a program for causing the computer to execute processing a step included in the operation of the vehicle terminal 50 such that the computer implements the function corresponding to the processing of the step. That is, the vehicle terminal program is a program for causing the computer to function as the vehicle terminal 50.

Some or all of the functions of the vehicle terminal 50 may be implemented by the dedicated circuit included in the control unit 51. In other words, some or all of the functions of the vehicle terminal 50 may be implemented by hardware.

Figure 6:
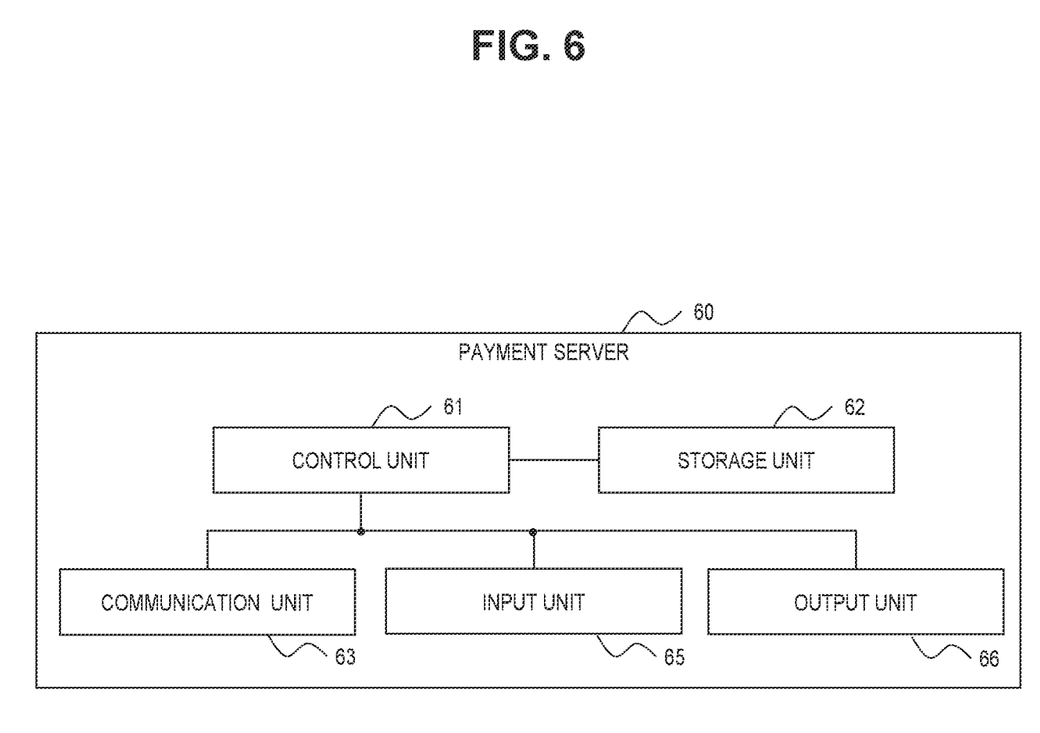
FIG. 6 is a diagram illustrating a configuration of a payment server according to the embodiment.

A configuration of the payment server 60 according to the present embodiment will be described with reference to FIG. 6.

The payment server 60 may be, for example, a server included in a cloud computing system or another computing system.

The payment server 60 includes a control unit 61, a storage unit 62, a communication unit 63, an input unit 65, and an output unit 66.

The control unit 61 includes one or more processors, or one or more dedicated circuits, or a combination thereof. The processor is a general-purpose processor (such as a CPU) or a dedicated processor specialized for specific processing. The dedicated circuit may be, for example, an FPGA or an ASIC. The control unit 61 executes information processing related to the operation of the payment server 60 while controlling each unit of the payment server 60.

The storage unit 62 includes one or more semiconductor memories, one or more magnetic memories, one or more optical memories, or a combination of at least two of these memory types. The semiconductor memory may be, for example, a RAM or a ROM. The RAM may be, for example, an SRAM or a DRAM. The ROM may be, for example, an EEPROM. The storage unit 62 may function as, for example, a main storage device, an auxiliary storage device, or a cache memory. The storage unit 62 stores information used for the operation of the payment server 60 and information acquired by the operation of the payment server 60.

The communication unit 63 includes one or more communication interfaces. The communication interface may be, for example, a LAN interface. The communication unit 63 receives the information used for the operation of the payment server 60 and transmits the information acquired by the operation of the payment server 60.

The input unit 65 includes one or more input interfaces. The input interface may be, for example, a physical key, a capacitance key, a pointing device, a touch screen integrated with a display, or a microphone. The input unit 65 accepts the input information used for the operation of the payment server 60. The input unit 65 may be connected to the payment server 60 as an external input device instead of being provided in the payment server 60. Any method, such as USB, HDMI® or Bluetooth®, may be used as the connection method.

The output unit 66 includes one or more output interfaces. The output interface may be, for example, a display or a speaker. The display may be, for example, an LCD or an organic EL display. The output unit 66 outputs the information acquired by the operation of the payment server 60. The output unit 66 may be connected to the payment server 60 as an external output device instead of being provided in the payment server 60. Any method, such as USB, HDMI® or Bluetooth®, may be used as the connection method.

The function of the payment server 60 is implemented by executing a payment program according to the present embodiment with the processor included in the control unit 61. In other words, the function of the payment server 60 is implemented by software. The payment program is a program for causing the computer to execute processing a step included in the operation of the payment server 60 such that the computer implements the function corresponding to the processing of the step. That is, the payment program is a program for causing the computer to function as the payment server 60.

Some or all of the functions of the payment server 60 may be implemented by the dedicated circuit included in the control unit 61. In other words, some or all of the functions of the payment server 60 may be implemented by hardware.

Figure 7:
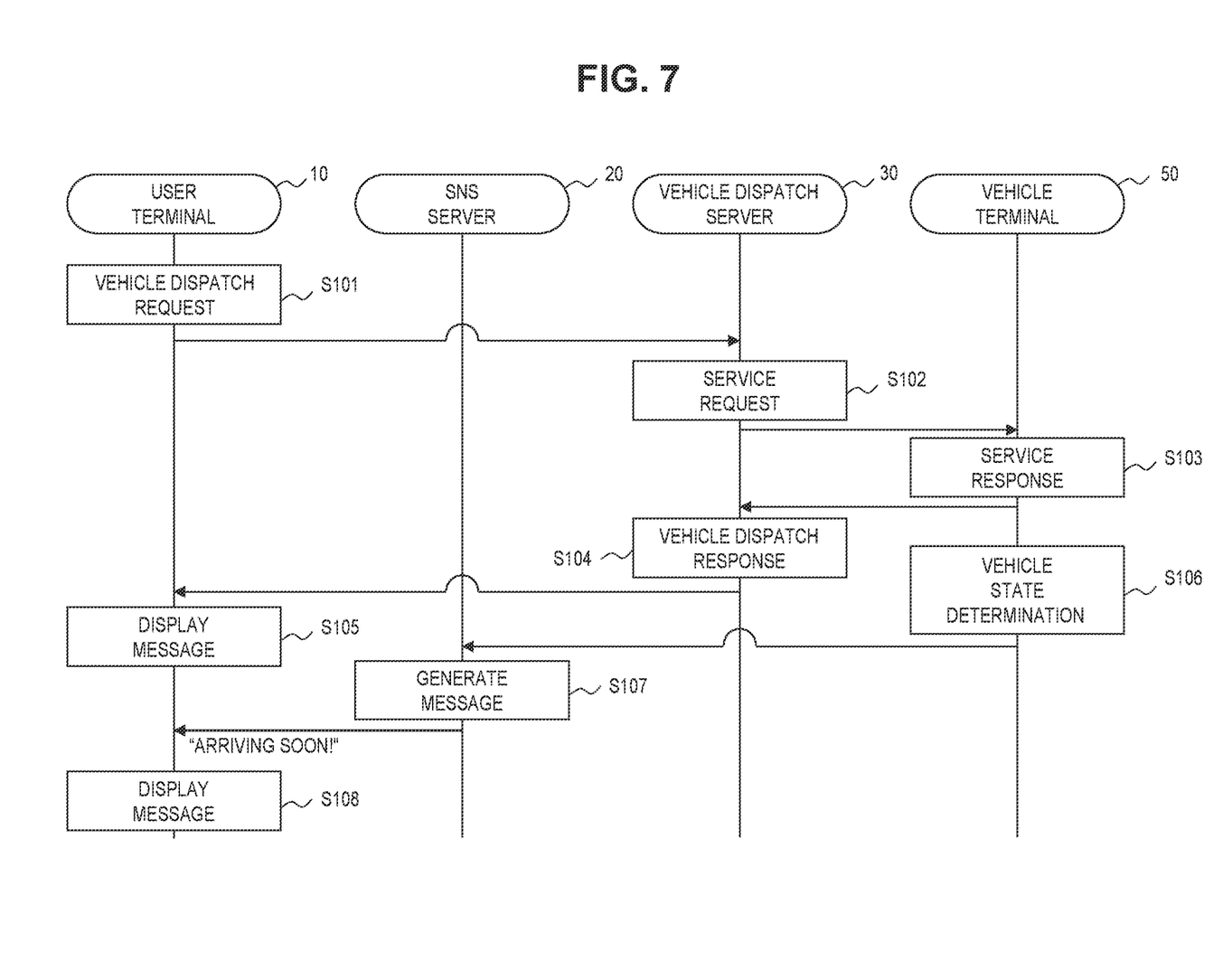
FIG. 7 is a diagram illustrating an operation of the control system according to the embodiment.
Figure 8:
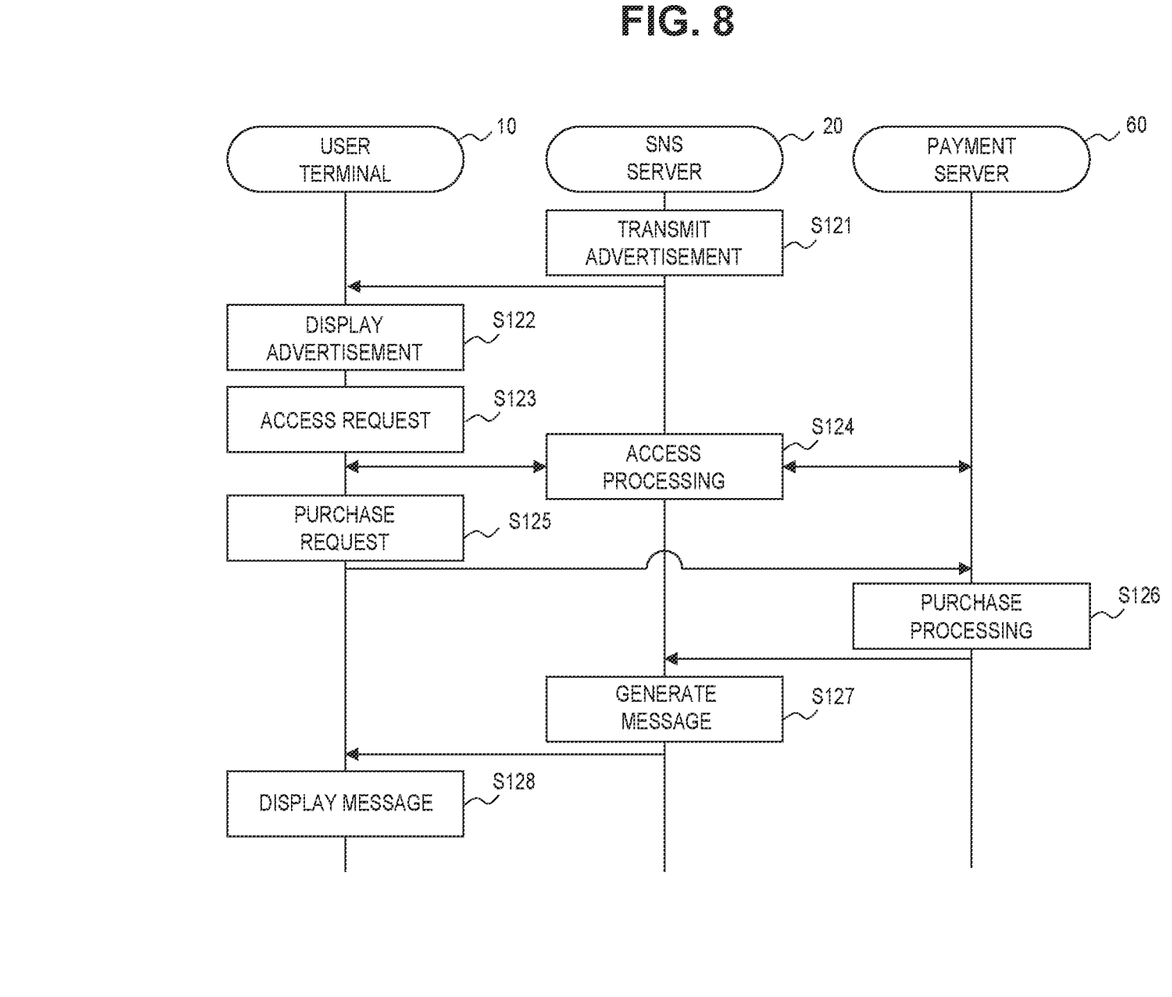
FIG. 8 is another diagram illustrating an operation of the control system according to the embodiment.

An operation of the control system 1 according to the present embodiment will be described with reference to FIGS. 7 and 8. This operation corresponds to the control method according to present embodiment.

As an example, it is assumed that the user terminal 10 is provided with the chat function by a program which is an instant messenger application, such as LINE®. Further, it is assumed that a program for making a reservation for vehicle dispatch is being operated on the user terminal 10.

In step S101, the control unit 11 of the user terminal 10 receives the information on the reservation for vehicle dispatch as input by the user with the input unit 15. The control unit 11 generates a vehicle dispatch request corresponding to the information on the reservation for vehicle dispatch. The control unit 11 transmits the generated vehicle dispatch request to the vehicle dispatch server 30 via the communication unit 13.

In this example, the user executes a program for making a reservation for vehicle dispatch, and inputs, to the user terminal 10, information on the reservation for vehicle dispatch which includes a vehicle dispatch point and a vehicle dispatch time. The control unit 11 of the user terminal 10 generates the vehicle dispatch request corresponding to the input information on the reservation for vehicle dispatch, and transmits the vehicle dispatch request to the vehicle dispatch server 30. The vehicle dispatch request includes the vehicle dispatch point and the vehicle dispatch time. The vehicle dispatch point is a point at which the user desires to board the vehicle 40. The vehicle dispatch time is a time when the user desires to board the vehicle 40.

In step S102, the control unit 31 of the vehicle dispatch server 30 receives the vehicle dispatch request transmitted in step S101 via the communication unit 33. The control unit 31 generates a service request corresponding to the received vehicle dispatch request. The control unit 31 transmits, via the communication unit 33, the generated service request to the vehicle terminal 50 used in the vehicle 40.

In this example, the control unit 31 of the vehicle dispatch server 30 transmits the service request including the vehicle dispatch point and the vehicle dispatch time, which are the same as those in the vehicle dispatch request, to the vehicle terminal 50 used in the vehicle 40.

In step S103, the control unit 51 of the vehicle terminal 50 used in the vehicle 40 receives the service request transmitted in step S102 via the communication unit 53. The control unit 51, by the output unit 56, displays the vehicle dispatch point and the vehicle dispatch time included in the received service request on a screen or outputs them by voice. The control unit 51 receives, by the input unit 55, a reply showing whether the driver of the vehicle 40 can handle with the service request. The control unit 51 generates a service response indicating the reply of whether the service request can be handled with by the driver. The control unit 51 transmits the generated service response to the vehicle dispatch server 30 via the communication unit 53. The control unit 51 stores, in the storage unit 52, location information of the vehicle dispatch point included in the received service request.

In this example, the driver of the vehicle 40 replies that the service request can be handled with by him/her. The control unit 51 of the vehicle terminal 50 used in the vehicle 40 transmits, to the vehicle dispatch server 30, the reply that the service request can be handled with by the driver.

In step S104, the control unit 31 of the vehicle dispatch server 30 receives the service response transmitted in step S103 via the communication unit 33. The control unit 31 generates a vehicle dispatch response corresponding to the received service response. The control unit 31 transmits the generated vehicle dispatch response to the user terminal 10 via the communication unit 33.

In this example, the control unit 31 of the vehicle dispatch server 30, when receiving the service response indicating that the vehicle 40 can be dispatched, generates the vehicle dispatch response indicating that the vehicle dispatch request can be handled with, and transmits the response to the user terminal 10.

In step S105, the control unit 11 of the user terminal 10 receives the vehicle dispatch response transmitted in step S104 via the communication unit 13. The control unit 11 generates a message corresponding to the received vehicle dispatch response. The control unit 11, by the output unit 16, displays the generated message on the screen or outputs the message by voice.

In this example, the control unit 11 of the user terminal 10, when receiving the vehicle dispatch response indicating the reply that the vehicle dispatch request can be handled with, generates a message saying "Taxi has been found!" The control unit 11, by the output unit 16, displays the message, i.e., "Taxi has been found!", on the screen or outputs the message by voice.

As an example, it is assumed that a program for making a reservation for vehicle dispatch is not being operated on the user terminal 10 in the following steps.

In step S106, the control unit 51 of the vehicle terminal 50 used in the vehicle 40 acquires the location information of the vehicle 40 by the positioning unit 54. The control unit 51 acquires the location information of the vehicle dispatch point stored in the storage unit 52 in step S103. The control unit 51 determines a state of the vehicle 40 based on the acquired location information of the vehicle 40 and the acquired location information of the vehicle dispatch point. The control unit 51 transmits data indicating the determined state of the vehicle 40 to the SNS server 20 via the communication unit 53.

In this example, the control unit 51 of the vehicle terminal 50 used in the vehicle 40 determines that the vehicle 40 is near the vehicle dispatch point designated by the user if a distance between a point indicated by the location information of the vehicle 40 and a point indicated by the location information of the vehicle dispatch point designated by the user is shorter than a threshold. Meanwhile, the control unit 51 of the vehicle terminal 50 used in the vehicle 40 determines that the vehicle 40 is not near the vehicle dispatch point designated by the user if the distance between the point indicated by the location information of the vehicle 40 and the point indicated by the location information of the vehicle dispatch point designated by the user is longer than the threshold. The control unit 51 notifies the SNS server 20 regarding the determination result of the state of the vehicle 40 via the communication unit 53. However, the determination result of the state of the vehicle 40 is not limited to whether the vehicle 40 is near the vehicle dispatch point designated by the user, but may include whether the speed of the vehicle 40 is high, or whether traffic is congested around the vehicle 40. For example, the control unit 51 of the vehicle terminal 50 may determine that the speed of the vehicle 40 is high if the speed of the vehicle 40 is higher than a threshold, and that the speed of the vehicle 40 is not high if the speed of the vehicle 40 is lower than the threshold. Furthermore, the control unit 51 of the vehicle terminal 50 can make such a determination based on data indicating the speed of the vehicle 40 acquired via the communication unit 53. In addition, the control unit 51 of the vehicle terminal 50 may determine that traffic is congested around the vehicle 40 if traffic around the vehicle 40 is heavier than a threshold, and that traffic is not congested around the vehicle 40 if the traffic around the vehicle 40 is lighter than the threshold. Furthermore, the control unit 51 of the vehicle terminal 50 can make such a determination by calculating traffic volume using a technique such as image recognition on image data showing the surroundings of the vehicle 40, which the image data is acquired via the communication unit 53. In this case, the image data showing the surroundings of the vehicle 40 is appropriately captured by, for example, an in-vehicle camera mounted on the vehicle 40. Alternatively, the control unit 51 of the vehicle terminal 50 may make such a determination based on data indicating the traffic volume around the vehicle 40, which the data is acquired from an external server via the communication unit 53.

In step S107, the control unit 21 of the SNS server 20 receives the data indicating the state of the vehicle 40, determined in step S106, via the communication unit 23. The control unit 21 generates a message to notify the user terminal 10 according to the received data indicating the state of the vehicle 40. The control unit 21 transmits the generated message to the user terminal 10 via the communication unit 23. In the present embodiment, the message may be text data, image data, or voice data.

In this example, it is assumed that the control unit 51 of the vehicle terminal 50 determines, as the determination result of the state of the vehicle 40, that the vehicle 40 is near the vehicle dispatch point designated by the user. The control unit 21 of the SNS server 20 generates a message saying "Arriving soon!", and transmits such a message to the user terminal 10. However, the message generated by the control unit 21 is not limited to the message including information on a time until the vehicle 40 arrives at the vehicle dispatch point designated by the user, like the message saying "Arriving soon!" For example, the control unit 21 may generate a message including information on a current location of the vehicle 40, such as a message saying "Now at the intersection of X street and Y street!" Alternatively, the control unit 21 may generate a message including a map image which includes the current location of the vehicle 40.

In step S108, the control unit 11 of the user terminal 10 receives the message transmitted in step S107 via the communication unit 13. The control unit 11 uses the chat function provided in the user terminal 10 to, by the output unit 16, display the received message on the screen or output the message by voice. The message may be, for example, an instant message. Further, a chatting partner may include a dialogue agent of the vehicle 40 or a dialogue agent of a business operator who provides the vehicle dispatch service of the vehicle 40.

The control unit 11 of the user terminal 10 receives a push notification including the message saying "Arriving soon!" from the SNS server 20. The control unit 11, by the output unit 16, displays the push notification, including the message saying "Arriving soon!", on the screen. Further, the push notification has a function of notifying the user of the received message when the control unit 11 receives the message via the communication unit 13, even in a case where the program providing the chat function is not being operated in the user terminal 10 or is operating in the background of the user terminal 10. Accordingly, the user can identify, in real time, the state of the vehicle 40 for which the user has made a reservation for vehicle dispatch, even if the program for making a reservation for vehicle dispatch or the program providing the chat function is not being operated in the user terminal 10 or is operating in the background of the user terminal 10. The control unit 11 receives tapping on the push notification including the message saying "Arriving soon!", which is made by the user through the input unit 15. When the user taps on the push notification including the message saying "Arriving soon!", the control unit 11, by the output unit 16, displays the message saying "Arriving soon!" on the screen using the chat function provided in the user terminal 10.

In step S121, the control unit 21 of the SNS server 20 transmits, to the user terminal 10, an advertisement including a link to an online store on which a product or service can be purchased, via the communication unit 23.

In this example, the control unit 21 of the SNS server 20 transmits, to the user terminal 10, an advertisement including a link to an online store from which image data can be purchased that indicates that a sender of the message will arrive at a place where a receiver of the message is waiting in a few minutes. Here, the image data indicating that the sender of the message will arrive at the place where the receiver of the message is waiting in a few minutes is a product provided by, for example, the business operator that provides the vehicle dispatch service of the vehicle 40, and is a product that can be used on the program providing the chat function. For example, the user who has purchased this image data can transmit the image data to a friend when he/she is about to arrive at a meeting place so as to meet the friend. However, the online store which the user can access from the link is not limited to the online store from which image data can be purchased that indicates that the sender of the message will arrive at the place where the receiver of the message is waiting in a few minutes. For example, the online store which the user can access from the link may be an online store from which, for example, voice data can be purchased that indicates that the sender of the message will arrive at the place where the receiver of the message is waiting in a few minutes. Further, the advertisement transmitted to the user terminal 10 by the control unit 21 of the SNS server 20 is not limited to the advertisement including the link to the online store of a product. For example, the advertisement transmitted by the control unit 21 of the SNS server 20 to the user terminal 10 may be provided by the business operator that provides the vehicle dispatch service for the vehicle 40, and may include a link to an online store from which a service can be purchased that offers a beverage to the user who is in the vehicle.

In step S122, the control unit 11 of the user terminal 10 receives the advertisement including the link to the online store on which a product or service can be purchased, transmitted in step S121, via the communication unit 13. The control unit 11 uses the chat function provided in the user terminal 10 to, by the output unit 16, display the received advertisement of a product or service on the screen or output the message by voice.

In this example, the control unit 11 of the user terminal 10 receives, from the SNS server 20, the advertisement including the link to the online store from which the image data can be purchased that indicates that the sender of the message will arrive at the place where the receiver of the message is waiting in a few minutes. The control unit 11 uses the chat function provided in the user terminal 10 to, by the output unit 16, display the received advertisement on the screen. Further, this advertisement may be displayed together with the image data when the image data indicating that the sender of the message will arrive at the place where the receiver of the message is waiting is actually used as the message from the vehicle terminal 50.

In step S123, the control unit 11 of the user terminal 10 receives a selection, which is made by user with the input unit 15, of the link to the online store on which a product or service can be purchased. When the user selects the link to the online store on which a product or service can be purchased, the control unit 11 generates an access request for the online store. The control unit 11 transmits the generated access request to the SNS server 20 via the communication unit 13.

In this example, the user selects the link to the online store from which the image data can be purchased that indicates that the sender of the message will arrive at the place where the receiver of the message is waiting in a few minutes. The control unit 11 of the user terminal 10 generates the access request for the online store selected by the user. The control unit 11 transmits the generated access request to the SNS server 20 via the communication unit 13.

In step S124, the control unit 21 of the SNS server 20 receives the access request transmitted in step S123 via the communication unit 23. The control unit 21 processes the received access request. Specifically, the control unit 21 allows the user terminal 10 to access the online store by executing the same processing as access processing on the received access request, which is executed in a conventional SNS.

In this example, the control unit 21 of the SNS server 20 allows the user terminal 10 to access the online store from which the image data can be purchased that indicates that the sender of the message will arrive at the place where the receiver of the message is waiting in a few minutes. Consequently, the control unit 11 of the user terminal 10, by the output unit 16, uses the chat function provided in the user terminal 10 to display the online store on the screen.

In step S125, the control unit 11 of the user terminal 10 accepts a registration of a purchase of a product or service, which is made by the user with the input unit 15. The control unit 11 generates a purchase request for a product or service as operated by the user for purchasing a product or service. The control unit 11 transmits the generated purchase request to the payment server 60 via the communication unit 13. The purchase request includes identification information such as a user's account information on the SNS, which is associated with the user terminal 10, in addition to information on a product or service that the user desires to purchase.

In this example, the control unit 11 of the user terminal 10 transmits, to the payment server 60 via the communication unit 13, the purchase request for the image data indicating that a sender of the message will arrive at a place where a receiver of the message is waiting in a few minutes.

In step S126, the control unit 61 of the payment server 60 receives the purchase request transmitted in step S125 via the communication unit 63. The control unit 61 processes the received purchase request. Specifically, the control unit 61 executes purchase processing including payment for the received purchase request, and transmits, to the SNS server 20, purchase information including a price of a product or service and the identification information of the user who has bought such a product or service.

In this example, the control unit 61 of the payment server 60 executes the purchase processing for the image data indicating that the sender of the message will arrive at the place where the receiver of the message is waiting in a few minutes. The control unit 61 transmits, to the SNS server 20, the purchase information including the price and the user identification information, via the communication unit 63.

In step S127, the control unit 21 of the SNS server 20 receives the purchase information transmitted in step S126 via the communication unit 23. The control unit 21 generates a message that notifies regarding a discount on a travel fare according to the price included in the received purchase information. The control unit 21 identifies the user terminal 10 to which the generated message will be transmitted based on the user identification information included in the received purchase information. The control unit 21 transmits the generated message to the identified user terminal 10 via the communication unit 23.

In this example, the control unit 21 of the SNS server 20 generates a message including, for example, a QR code® indicating that the user can get a discount on a travel fare corresponding to the price of the image data that indicates that the sender of the message will arrive at the place where the receiver of the message is waiting in a few minutes. The control unit 21 transmits the message including such a QR code® to the identified user terminal 10 via the communication unit 23.

In step S128, the control unit 11 of the user terminal 10 receives the message transmitted in step S127 via the communication unit 13. The control unit 11 uses the chat function provided in the user terminal 10 to, by the output unit 16, display the received message on the screen or output the message by voice.

In this example, the control unit 11 of the user terminal 10, by the output unit 16, displays, on the screen, the message including, for example, the QR code® indicating that the user can get a discount on a travel fare corresponding to the price of the image data that indicates that the sender of the message will arrive at the place where the receiver of the message is waiting in a few minutes. The user allows the control unit 51 of the vehicle terminal 50 to read the QR code® included in the displayed message via a camera mounted or connected to the vehicle terminal 50. The control unit 51 transmits the information included in the QR code® to an external server via the communication unit 53. The external server executes processing for a discount on a travel fare based on the received information included in the QR code®. However, a method by which the user gets a discount on a travel fare is not limited thereto. For example, the control unit 51 of the vehicle terminal 50 may receive a message notifying that the user can get a discount on a travel fare from the SNS server 20, via the vehicle dispatch server 30, and outputs, by the output unit 56, the received message to the driver of the vehicle 40 by display or voice. Consequently, the driver may be assisted in providing a discount on a travel fare to the user.

As described above, in the present embodiment, the communication unit 23 of the control device communicates with the user terminal 10 provided with the chat function. The control unit 21 of the control device transmits a message to the user terminal 10 via the communication unit 23. The message is for notifying the user of the state of the vehicle 40 heading to a vehicle dispatch point designated by the user who has made a reservation for vehicle dispatch, which is to be output from the user terminal 10 by the chat function. In the example illustrated in FIGS. 7 and 8, the control unit 21 of the SNS server 20 corresponding to the control device communicates with the user terminal 10 provided with the chat function. The control unit 21 of the SNS server 20, corresponding to the control device, transmits a message to the user terminal 10 via the communication unit 23. The message is for notifying the user of the state of a vehicle 40 heading to the vehicle dispatch point designated by the user who has made a reservation for vehicle dispatch, which is to be output from the user terminal 10 by the chat function.

With the present embodiment, the convenience of the vehicle dispatch service can be improved.

In the present embodiment, the control unit 21 of the control device transmits, to the user terminal 10 via the communication unit 23, the advertisement including the link to the online store on which a product or service can be purchased, which is to be output from the user terminal 10 by the chat function. In a case where the user purchases a product or service from the online store, the control unit 21 of the control device generates the message notifying the user that a discount on a travel fare of the user is available. In the example illustrated in FIGS. 7 and 8, the control unit 21 of the SNS server 20, corresponding to the control device, transmits, to the user terminal 10 via the communication unit 23, the advertisement including the link to the online store on which a product or service can be purchased, which is to be output from the user terminal 10 by the chat function. When the user purchases a product or service from the online store, the control unit 21 of the SNS server 20, corresponding to the control device, generates the message notifying the user that a discount on a travel fare of the user is available.

With the present embodiment, the satisfaction that a user who uses the vehicle dispatch service feels is enhanced.

As a modified example of the present embodiment, the control unit 21 of the control device, transmits to the user terminal 10 via the communication unit 23, the advertisement including a link to a download site from which a predetermined program can be downloaded, which is to be output from the user terminal 10 by the chat function. The control unit 21 of the control device may generate the message notifying the user that a discount on a travel fare of the user is available in a case where the user terminal 10 downloads the predetermined program from the download site. For example, the control unit 21 of the SNS server 20, corresponding to the control device, transmits, to the user terminal 10 via the communication unit 23, the advertisement including a link to a download site from which a predetermined program can be downloaded, which is to be output from the user terminal 10 by the chat function. The control unit 21 of the SNS server 20, corresponding to the control device, may generate the message notifying the user that a discount on a travel fare of the user is available in a case where the user terminal 10 downloads the predetermined program from the download site. The predetermined program may be, for example, a program which is run on the user terminal 10 and makes a reservation for vehicle dispatch.

With the present modified example, the satisfaction of the user who uses the vehicle dispatch service is enhanced.

The present disclosure is not limited to the embodiments described above. For example, a plurality of blocks described in the block diagram may be integrated, or a single block may be divided into several blocks. Instead of executing the steps described in the flowchart in chronological order according to the description, the steps may be executed in parallel or in a different order depending on the processing capability of the device executing the steps, or as necessary. Other changes or modifications can be made without departing from the scope of the present disclosure.

What is claimed is:

1. A control device, comprising:
a server configured to:
communicate, via a communication interface, with a user terminal, the user terminal operating a chat function in the form of an instant messenger application, the instant messenger application being accessible on a display of the user terminal; and
transmit to the user terminal, via the communication interface, a message notifying a user of a state of a semi-autonomous vehicle heading to a vehicle dispatch point designated by the user who has made a reservation for vehicle dispatch, the reservation for vehicle dispatch causes the semi-autonomous vehicle to be dispatched to the vehicle dispatched point, the message is output from the user terminal as part of the instant messenger application, the message is displayed on a display of the user terminal,
transmit to the user terminal, via the communication interface, an advertisement including a link to an online store on which a product or service is purchasable when a sender of the advertisement is within a predetermined amount of time from a particular location, the advertisement is output from the user terminal via the instant messenger application; and
generate a message notifying the user that a discount on a travel fare of the user is available in a case where the user purchase the product or service from the online store,
wherein:
the semi-autonomous vehicle includes one or more GNSS receivers that acquire location information of the semi-autonomous vehicle, and one or more processors;
the one or more processors are configured to, in real time, determine the state of the semi-autonomous vehicle based on the acquired location information and send the determination result of the state to the server;
the server is configured to acquire the determination result from the one or more processors, and to transmit, in real time, data representative of a current location of the semi-autonomous vehicle; and display on the display of the user terminal the advertisement together with image data indicating that the sender of a message will arrive at the particular location within the predetermined amount of time.

2. The control device according to claim 1, wherein the state of the semi-autonomous vehicle includes information on whether the semi-autonomous vehicle is near the vehicle dispatch point.

3. The control device according to claim 1, wherein the state of the semi-autonomous vehicle includes information on whether a speed of the semi-autonomous vehicle is high.

4. The control device according to claim 1, wherein the state of the semi-autonomous vehicle includes information on whether traffic is congested around the semi-autonomous vehicle.

5. The control device according to claim 1, wherein the message includes information on time remaining until the semi-autonomous vehicle arrives at the vehicle dispatch point.

6. The control device according to claim 1, wherein the message includes information on a current location of the semi-autonomous vehicle.

7. The control device according to claim 1, wherein the control unit is configured to:
transmit to the user terminal, via the communication interface, an advertisement including a link to a download site on which a predetermined program is downloadable, the advertisement being to be is output from the user terminal by the chat function; and
generate a message notifying the user that a discount on a travel fare of the user is available in a case where the user downloads the predetermined program from the download site.

8. The control device according to claim 7, wherein the predetermined program is run on the user terminal and makes a reservation for the vehicle dispatch.

9. A control system, comprising:
the control device according to claim 1; and
a vehicle terminal used in the semi-autonomous vehicle, wherein:
the vehicle terminal is configured to transmit data indicating the state of the semi-autonomous vehicle to the control device; and
the control unit of the control device is configured to transmit to the user terminal, via the communication interface, a message generated based on the received data, the message notifying a user of the state of the semi-autonomous vehicle.

10. A program that causes a computer used by a user to:
provide a chat function in the form of an instant messenger application, the instant messenger application is output on a display associated with the computer used by the user;
receive, via a communication interface of the computer used by the user, a message notifying a user of a state of a semi-autonomous vehicle heading to a vehicle dispatch point designated by the user who has made a reservation for vehicle dispatch, the reservation for vehicle dispatch causes the semi-autonomous vehicle to be dispatched to the vehicle dispatched point; and
output the received message via the instant messenger application, the message is displayed on a display of a user terminal of the user,
wherein:
the computer comprises a memory that is utilized to store information acquired as a result of the operation of the computer;
the semi-autonomous vehicle includes one or more GNSS receivers that acquire location information of the semi-autonomous vehicle, and one or more processors;
the one or more processors are configured to, in real time, determine the state of the semi-autonomous vehicle based on the acquired location information and send the determination result of the state to the server;
the server is configured to:
acquire the determination result from the one or more processors, and to transmit, in real time, data representative of a current location of the semi-autonomous vehicle;
transmit to the user terminal, via the communication interface, an advertisement including a link to an online store on which a product or service is purchasable, the advertisement is output from the user terminal via the instant messenger application when a sender of the advertisement is within a predetermined amount of time from a particular location;
generate a message notifying the user that a discount on a travel fare of the user is available in a case where the user purchase the product or service from the online store; and
display on the display of the user terminal the advertisement together with image data indicating that a sender of a message will arrive at the particular location within the predetermined amount of time.

11. A control method executed by a control device comprising a server; and a memory that is utilized to store information acquired as a result of the operation of the server, the control method comprising:
transmitting, by the server via a communication interface, to a user terminal operating a chat function in the form of an instant messenger application, a message notifying a user of a state of a semi-autonomous vehicle heading to a vehicle dispatch point designated by a user who has made a reservation for vehicle dispatch, the reservation for vehicle dispatch causes the semi-autonomous vehicle to be dispatched to the vehicle dispatched point, the message is output from the user terminal via the instant messenger application, the message is displayed on a display of the user terminal,
transmitting, by the server via the communication interface to the user terminal, an advertisement including a link to an online store on which a product or service is purchasable, the advertisement is output from the user terminal via the instant messenger application when a sender of the advertisement is within a predetermined amount of time from a particular location; and
generating, by the server, a message notifying the user that a discount on a travel fare of the user is available in a case where the user purchase the product or service from the online store,
wherein:
the semi-autonomous vehicle includes one or more GNSS receivers that acquire location information of the semi-autonomous vehicle, and one or more processors;
the one or more processors are configured to, in real time, determine the state of the semi-autonomous vehicle based on the acquired location information and send the determination result of the state to the server;
the server is configured to acquire the determination result from the one or more processors, and to transmit, in real time, data representative of a current location of the semi-autonomous vehicle; and display on the display of the user terminal the advertisement together with image data indicating that a sender of a message will arrive at the particular location within the predetermined amount of time.

12. The control method according to claim 11, wherein the state of the semi-autonomous vehicle includes information on whether the semi-autonomous vehicle is near the vehicle dispatch point.

13. The control method according to claim 11, wherein the state of the semi-autonomous vehicle includes information on whether a speed of the semi-autonomous vehicle is high.

14. The control method according to claim 11, wherein the state of the semi-autonomous vehicle includes information on whether traffic is congested around the semi-autonomous vehicle.

15. The control method according to claim 11, wherein the message includes information on a time remaining until the semi-autonomous vehicle arrives at the vehicle dispatch point.

16. The control method according to claim 11, wherein the message includes information on a current location of the semi-autonomous vehicle.

17. The control method according to claim 11, further comprising:

transmitting, to the user terminal, an advertisement including a link to a download site from which a predetermined program is downloadable, the advertisement being to be output from the user terminal by the chat function; and generating a message notifying the user that a discount on a travel fare of the user is available in a case where the user downloads the predetermined program from the download site.

18. The control method according to claim 17, wherein the predetermined program is run on the user terminal and makes a reservation for the vehicle dispatch.

* * * * *